Sept. 25, 1956  G. JENDRASSIK  2,764,340
PRESSURE EXCHANGERS
Filed Aug. 28, 1950  4 Sheets-Sheet 1

Inventor
George Jendrassik
By
Stevens, Davis, Miller & Mosher
Attorneys

Sept. 25, 1956  G. JENDRASSIK  2,764,340
PRESSURE EXCHANGERS
Filed Aug. 28, 1950  4 Sheets-Sheet 3

Inventor.
George Jendrassik
By
Stevens, Davis, Miller & Mosher
his Attorneys

Sept. 25, 1956    G. JENDRASSIK    2,764,340
PRESSURE EXCHANGERS

Filed Aug. 28, 1950    4 Sheets-Sheet 4

Inventor
By George Jendrassik
Stevens, Davis, Miller + Mosher
his Attorneys

United States Patent Office 2,764,340
Patented Sept. 25, 1956

2,764,340

PRESSURE EXCHANGERS

George Jendrassik, London, England; Andre G. T. Boszormenyi and Clara Jendrassik, executors of said George Jendrassik, deceased, assignors, by mesne assignments, to Jendrassik Developments Limited, London, England Application August 28, 1950, Serial No. 181,846

Claims priority, application Great Britain September 9, 1949

10 Claims. (Cl. 230—69)

This invention relates to pressure exchangers of the kind comprising a ring of cells between which and other structure there is relative rotation when the machine is operating, and the working cycle of which involves the compression of gas in some cells of the series and the simultaneous expansion of gas in other cells of the series, the compression and expansion stages thus formed being associated with heat input and heat rejection stages (at high or low pressure) involving the flow of gas into, and/or out of, the cells.

The many pressure exchangers which have been proposed in the past and those which have been built have all comprised a cell ring rotatable relatively to ducting through which gas flows to and from the cells. At one rotational position of a cell a fresh gaseous charge is taken into it and thereafter it is compressed by gas impulse or wave action within the cell or by transfer of gas pressure from another cell or by a combination of the two methods. After the gas has been thus compressed the cell is usually arranged to become open to further ducting and some at least of the gas leaves the cell. If the machine is working as a heat engine, at this position the cell also receives a new influx of gas at a higher pressure and higher temperature than that which left. Upon further relative rotation taking place, expansion of that charge is effected, again either by gas impulses or waves passing through the cell or by transfer of gas pressure to another cell or by both methods. The cell then releases its charge into ducting taking the gas away from the cell ring and a fresh charge is again introduced. This process is repeated with each revolution.

The gas which leaves the cell after compression normally passes to a combustion chamber or other like heat input stage apparatus. The hot, high pressure gas so made available may be fed to an expansion machine such as a turbine, whereby shaft power is produced and a remaining part of this gas can constitute the new influx of gas into a cell of the pressure exchanger. Thus it will be seen that under these circumstances gas flows both into and out of a cell at this stage of the cycle.

After expansion of the gas in a cell, ducting is arranged to communicate therewith through which gas removal is effected. As far as the gas content of a cell is concerned this can be considered a heat rejection stage. At the same stage of operations a fresh low pressure charge is introduced. Hence there is again gas flow into and out of a cell. It is common practice for the removed gas to be exhausted to atmosphere and for the fresh charge to consist of cool ambient air.

The gas flow arising at a heat input stage need if possible be no more than the removal from the cells of surplus gas resulting from the increase in volume which arises from heating, and similarly, the gas flow arising at a heat rejection stage need if possible be no more than the addition of gas to the cells to make up for loss in volume resulting from cooling.

In practice it is a convenient expedient for at least the heat rejection (and possibly also the heat input) to occur externally of the cells, and to this end it has been proposed for the gas flow associated with the heat rejection and heat input stages to be effected by the process (hereinafter called "scavenging") by which each cell in the heat input (or heat rejection) zone has its gas content removed and replaced by other gas which, externally of the cells, has been specially heated (or cooled), or which in either case is derived from a source of gas which is already at the desired high (or low) temperature, this process of removal and replacement involving a continuous current of gas flowing towards, through, and from the cells in which it is occurring.

The points in the working cycle at which heat input and heat rejection take place depends on the intended use of the machine. If the pressure exchanger is for use as a source of high pressure hot gas (e. g. for expansion in a gas turbine, or other engine, to provide mechanical work), then heat input occurs at high pressure and heat rejection at low pressure. On the other hand if the pressure exchanger be for use as a heat pump, or a refrigerating machine, then the converse is the case (i. e. heat input at low pressure, heat rejection at high pressure).

The present invention is concerned with pressure exchangers of the kind referred to, in which the cells are scavenged at least at the heat rejection stage, and has for its main aim to provide constructions in which the withdrawal of gas from the cells during a scavenging period may be effected from the same side of each cell as that to which is led the supply of fresh gas.

From one aspect the invention provides a pressure exchanger of the kind referred to, and in which scavenging is employed at least at the heat rejection stage, wherein each cell comprises structure which, in association with duct means leading the scavenging gas to and from the cells constrains the current of such gas first to enter, and sweep only in one direction through, a part or parts only of the cell having a cross-sectional area, or a total cross-sectional area (transversely to the scavenging gas flow) which is less than the full cross-sectional area of the cell (transversely to the scavenging flow); then constrains such gas to undergo reversal of flow within the cell; and finally constrains it to sweep through the remaining volume of the cell and emerge therefrom on the entry side.

From another aspect the invention provides a pressure exchanger of the kind referred to, in which scavenging is employed at least at the heat rejection stage and the direction of flow of the gas supplied to and withdrawn from the cells during a scavenging period is axial with respect to the ring of cells, or has a substantial axial component, wherein each cell comprises structure which, in association with duct means leading the scavenging gas to and from the cells, constrains the current of such gas to undergo reversal of flow within the cell.

Thus, for example, the invention may provide a pressure exchanger of the kind referred to, comprising at least one rotor embodying a ring of cells, which are scavenged at least at the heat rejection stage, wherein each cell is divided by partition structure into a plurality of gas passages communicating with each other at one end by reason of the discontinuance of the partition structure, and wherein duct means leading the scavenging gas to and from the cells is so constructed and arranged that the current of such gas is constrained first to sweep in one direction through at least one of the said passages, then to undergo reversal of flow within the cells, and finally to sweep, in the new direction of flow, through the remaining passage or passages.

In a case where the general direction of flow of the scavenging gas current, while sweeping through the cells, is axial with respect to the rotor, or has a substantial axial component, the said partition structure may form gas passages at different radial stations e. g. two passages, a radially inner and a radially outer.

By way of example there will now be described with reference to the accompanying drawings some specific embodiments according to the present invention of pressure exchangers comprising at least one rotor embodying a ring of cells, being machines in which scavenging is employed both at the heat rejection and at the heat input stages, and in which the whole of the pressure rise occurring in the machine is effected by expansion stage cells being placed into communication with compression stage cells whereby the gas in the cells at higher pressure expands into the cells at lower pressure thus compressing gas in the latter cells, with consequent flow of transfer gas from expanding cells to compression cells. The operation of such machines is known from prior art and consequently the mode of operation of the machine as described below will not be herein fully and systematically expounded, though it will be alluded to.

For convenience it will be assumed that the machine as described below with reference to the accompanying drawings is intended for use to provide a supply of hot gas under pressure, for example gas for expansion in a turbine to provide mechanical work.

Figures 1, 2:
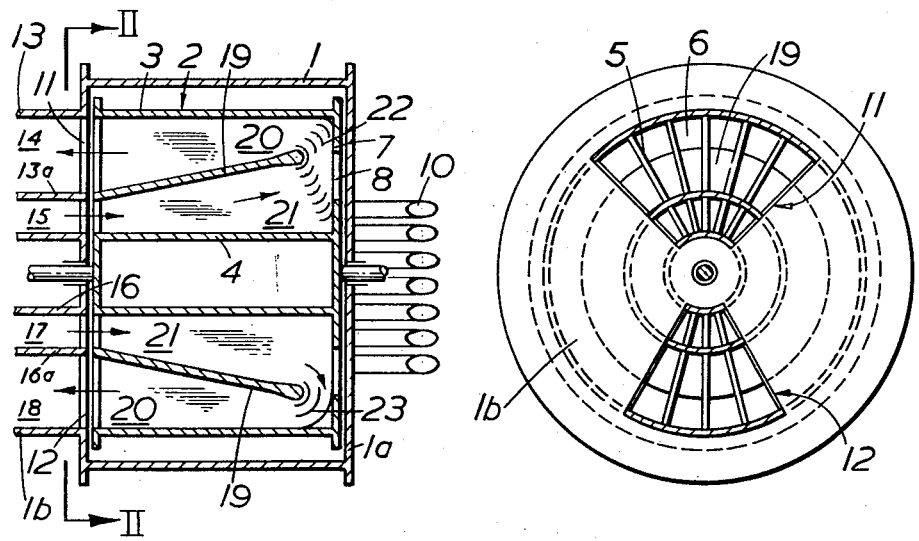
Figure 1 is an axial section through a single rotor pressure exchanger along the line I—I in Figure 4 referred to below.
Figure 2 is a section on the line II—II in Figure 1.
Figure 3:
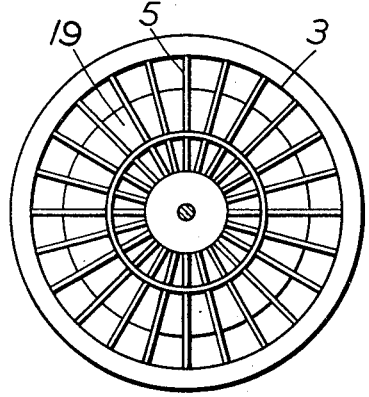
Figure 3 is an end view of the rotor with the stationary casing removed, taken from the left hand side of Figure 1.
Figure 3A:
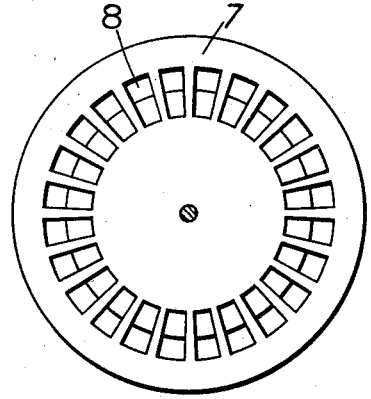
Figure 3a is an end view of the end of the rotor opposite to that shown in Figure 3.
Figure 4:
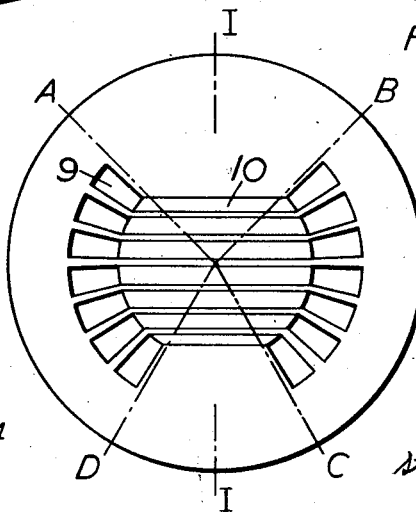
Figure 4 is an end view taken from the right hand side of Figure 1, showing the pipes for the transfer gas flow.

The pressure exchanger shown in Figures 1 to 4 comprises a cylindrical outer casing 1 containing a rotor 2 which is made up of an outer cylinder 3 and an inner cylinder 4 which are interconnected by radial partitions 5 which form cells 6. The ends of the cells are fully open at one end (the left hand end in Figure 1) but at the other end the rotor is provided with an end wall 7 which closes the cells except for apertures 8 for transfer gas flow.

The ends of casing 1 are formed by end plates 1a and 1b of which the plate 1a is provided around the expansion and compression arcs BC, DA (Figure 4) with apertures 9 which register with the apertures 8 and are connected in pairs by pipes 10 for the flow of transfer gas. The end plate 1b has sector-shaped openings as shown, an opening 11 to which is connected the duct 13 for low pressure scavenging at the heat rejection stage, and an opening 12 to which is connected the duct 16 for high pressure scavenging at the heat input stage. The duct 13 is divided by a partition 13a into a duct 14 for the exit of expanded gas from the cells, and a duct 15 for the entry of fresh low pressure gas. Similarly a partition 16a divides the ducting 16 into a duct 17 for the entry of hot gas at the highest pressure of the cycle, and a duct 18 for the exit of gas which has undergone compression in the cells.

Each cell 6 is partitioned into a radially outer passage 20 and a radially inner passage 21 by a substantially frusto-conical element 19 so located that opposite the openings 11 and 12 it forms a continuation of the partitions 13a and 16a. The partition element 19 is discontinued towards one end of the cells leaving an undivided space by which the passages 20 and 21 communicate.

During a scavenging period the incoming gas is conveyed by the duct 15 or 17 and enters the radially inner passage 21, undergoes reversal of flow around the lip of the partition 19, and flows in the new direction through the outer passage 20 from which gas is discharged into the duct 14 or 18. The course of the scavenging current is indicated by the arrows in Figure 1. Of course, matters might be so arranged that the incoming gas entered the radially outer partition 20.

In practice, the reversal of gas flow involves unavoidable losses due to a pressure to velocity conversion in the construction between the lip of the partition 20 and the cell wall. In order to reduce the losses the passages 20, 21 are both made divergent in the direction of gas flow as shown. Further to reduce losses in the bend the exposed lip of the partition 19 may be thickened and rounded as shown, and also suitable vanes may be used in the bend, two examples of these being shown at 22 and 23 of Figure 1.

Figure 5:
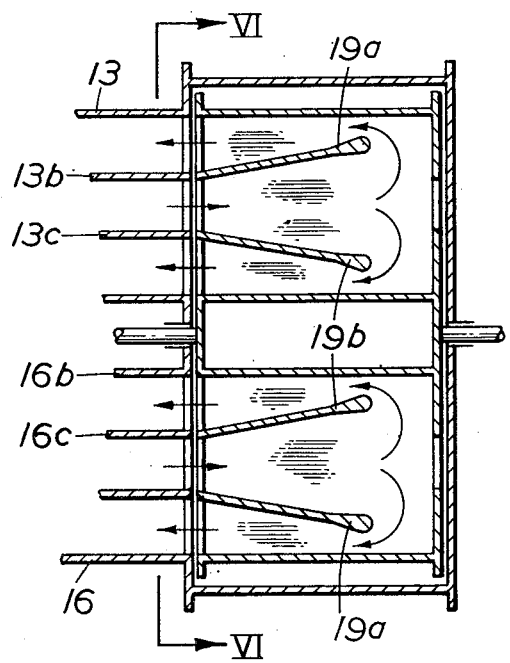
Figure 5 is an axial section through a modified single rotor machine.
Figure 6:
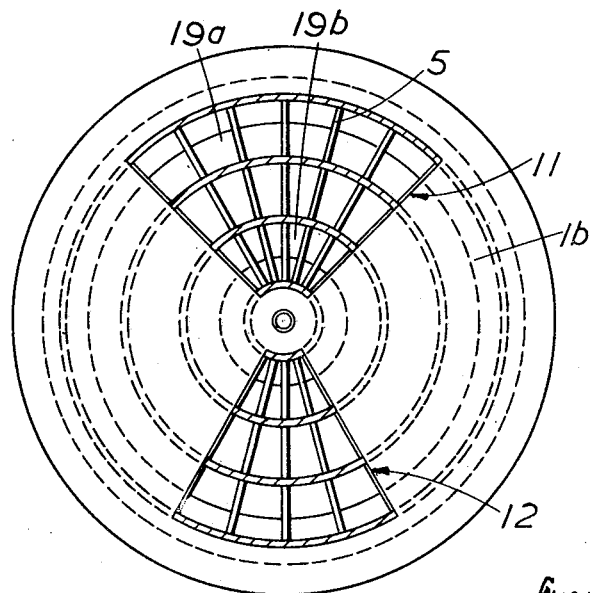
Figure 6 is a section on the line VI—VI of Figure 5.

In Figures 5 and 6 is shown an arrangement very similar to Figure 1 but in which two partition elements 19a, 19b are employed to divide the cells into three separate gas passages. Similarly the ducting 13, 16 is divided into three separate ducts by partitions 13b, 13c, 16b, 16c. The direction of the scavenging gas current is clearly shown by the arrows in Figure 5. Alternatively the incoming gas may enter by way of the radially outer and inner ducts, and the outgoing gas then leaves by way of the central duct.

Figure 7:
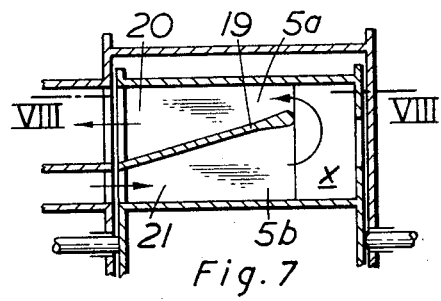
Figure 7 is a half section in the axial direction of a modified machine similar to Figure 1.
Figure 8:
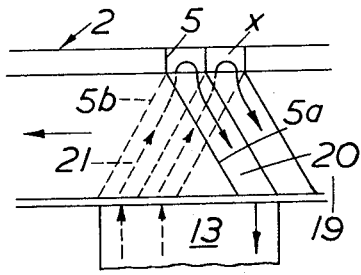
Figure 8 is a development into the circumferential plane VIII—VIII in Figure 7.

Figures 7 and 8 represent a modification of Figure 1 for the purpose of securing substantially shockless entry of the incoming gas into the cells and on the other hand substantially axial discharge of the gas leaving the cells, having regard in each case to the rotatiton of the rotor. To this end each radial partition comprises a portion 5 forming an undivided space x which is aligned in the axial direction. In the part of the cell which is divided by the partition 19, the radial partitions each comprise a portion 5a radially outward of the element 19 and inclined away from the direction of rotation, and a portion 5b radially inward of the element 19 and inclined in the direction of rotation. Thus, in this case each cell comprises a radially outer gas passage 20 (used as the exit passage during a scavenging period), and a radially inner passage 21 (used as the entry passage during a scavenging period) and a portion x. The direction of flow of the scavenging current is shown by arrows in Figures 7 and 8.

Figure 9:
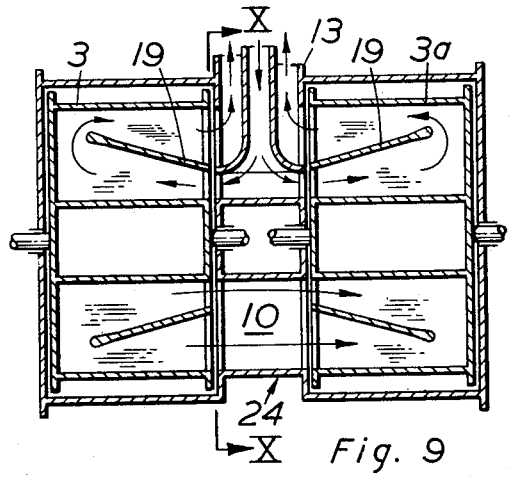
Figure 9 is an axial section of a two rotor machine taken along two planes at right angles as shown by the line IX—IX in Figure 10.
Figure 10:
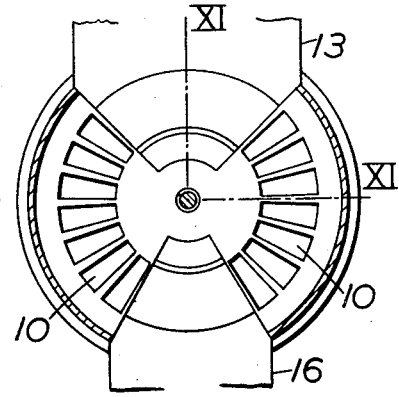
Figure 10 is a section along the line X—X in Figure 9.

Figures 9 and 10 show a machine having two contra-rotating similar rotors 3, 3a separated by stationary structure 24. The operation of such a two rotor machine has also been previously described and will therefore not be described herein except for mentioning that expansion of gas in cells of one rotor produces compression of gas in cells of the other rotor. Each rotor is similarly constructed to those of Figure 1 with a partition element 19 and the direction of the scavenging current is shown by the arrows in the upper half of Figure 9. Ducting 13 forming part of the structure 24 is provided for leading gas to and from the machine at one scavenging stage. Similar ducting 16 (Figure 10) is provided for the other scavenging stage. In this case transfer gas flows through the open inner ends of the cells, no special openings corresponding to 8 in Figure 1 being provided. Transfer gas is ducted from one rotor to the other by way of passages 10 corresponding functionally to the pipes 10 in Figure 1.

Figure 11:
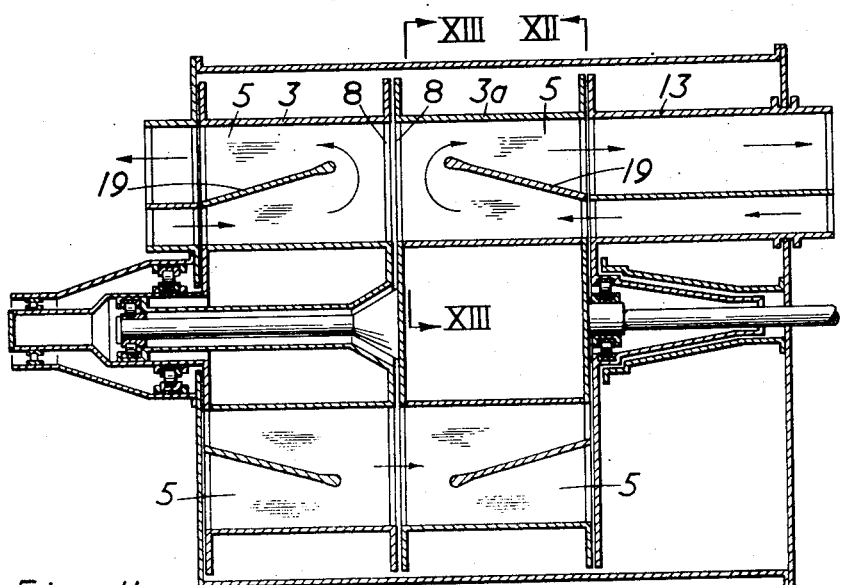
Figure 11 represents a two rotor machine in which no stationary structure intervenes between the rotors and is an axial section taken along two planes at right angles in a similar manner to Figure 9.
Figure 12:
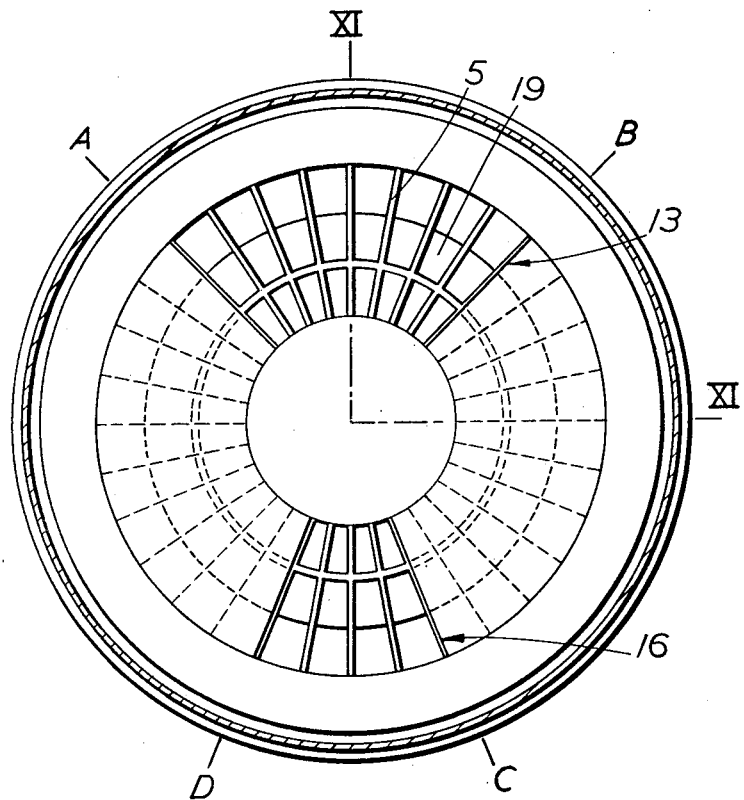
Figure 12 is a section on the line XII—XII in Figure 11.
Figure 13:
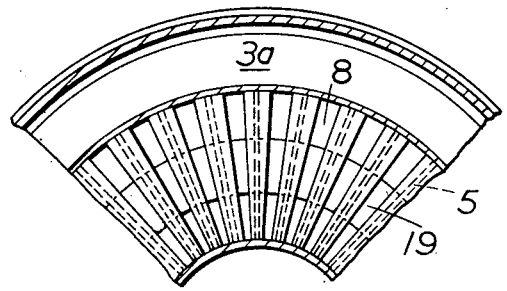
Figure 13 is a section on the line XIII—XIII in Figure 11.

Figure 11 is a view corresponding to Figure 9 showing a similar two rotor machine with the difference that there is no stationary structure separating the rotors. In this case the adjacent inner walls of the cells are provided with special openings 8 for the flow of transfer gas and scavenging takes place through the open outer ends of the cells. Ducting 13 for low pressure scavenging is provided at each end of the machine, and similar ducting (not shown) is provided at each end for the high pressure scavenging.

It remains to add that it is not essential for the cell gas passages, such as 20, 21, to be divergent. They may be parallel-walled, assuming some alternative aerodynamic design to reduce losses in the 180° bend.

What I claim is:

1. A scavenging arrangement for a pressure exchanger having a cell ring with cells around the periphery thereof, an element adjacent said cell ring mounted co-axially for relative rotation therewith and inlet and outlet means formed in said element and providing access for gas flow into and out of said cells, the arrangement comprising the positioning of said inlet and outlet means opposite the same face of said cell ring, ducting leading to said inlet means, further ducting leading from said outlet means and a partition extending from said face part way through each of said cells to form in each of said cells two passageways interconnected at their ends remote from said face.

2. A scavenging arrangement as defined in claim 1 wherein said partition is inclined relative to said cell to form two divergent passageways for gas flow through said cell.

3. A scavenging arrangement as defined in claim 1 wherein said partition extends axially through said cell to form two radially spaced passageways.

4. A scavenging arrangement as defined in claim 3 wherein a second partition extends axially part way through each said cell to form with said first mentioned partition three radially spaced passageways interconnected at their ends remote from said face, and said ducting through which gas passes towards said cells is in registry with one of said radially central passageways and said radially inner and outer passageways, and said further ducting is in registry with the other of said radially central passageways and said radially inner and outer passageways.

5. A scavenging arrangement as defined in claim 4 wherein said ducting through which gas passes towards said cells is in registry with said radially central passageways, and said further ducting is in registry with said radially inner and outer passageways.

6. A scavenging arrangement as defined in claim 3 wherein said ducting through which gas passes towards said cells is in registry with said radially inner passageways and said further ducting is in registry with said radially outer passageways.

7. A scavenging arrangement as defined in claim 1 wherein each said passageway is inclined relative to its own gas flow direction away from the direction of rotation of said rotor to afford substantial shockless entry and exit of gas.

8. A scavenging arrangement for a pressure exchanger having a cylindrical rotor and cells adjacent the circumferential periphery thereof, an element adjacent said cell ring mounted co-axially for relative rotation therewith and inlet and outlet means formed in said element and providing access for gas flow into and out of said cells, the arrangement comprising ducting leading to said inlet means and thence to an end face of said rotor normal to its rotational axis through which gas is passed towards said cells, further ducting leading via said outlet means normally from said face and radially spaced from said first-mentioned ducting through which gas leaving said cells is passed, and a partition extending from said face axially part way through each of said cells to form two radially spaced passageways interconnected at their ends remote from said face, said first-mentioned ducting being in registry with one radial set of said passageways and said further ducting being in registry with the other radial set of said passageways.

9. A scavenging arrangement as defined in claim 8 wherein the end of said partition remote from said face is rounded off to minimize gas flow losses.

10. A scavenging arrangement as defined in claim 8 wherein flow directing vanes are distributed across said passageways at their ends remote from said face.

References Cited in the file of this patent
UNITED STATES PATENTS

| | | |
|---|---|---|
| 2,045,152 | Lebre | June 23, 1936 |
| 2,399,394 | Seippel | Apr. 30, 1946 |
| 2,461,186 | Seippel | Feb. 8, 1949 |